G. H. L. DEBAECKER.
APPARATUS FOR TURNING OVER SHEETS OF GLASS TO FACILITATE WORKING ON BOTH SIDES OF THE SHEETS.
APPLICATION FILED JAN. 30, 1920.

1,371,868.

Patented Mar. 15, 1921.
3 SHEETS—SHEET 1.

INVENTOR
GEORGES HENRI LÉON DEBAECKER
BY Horne and Horne
ATTORNEYS

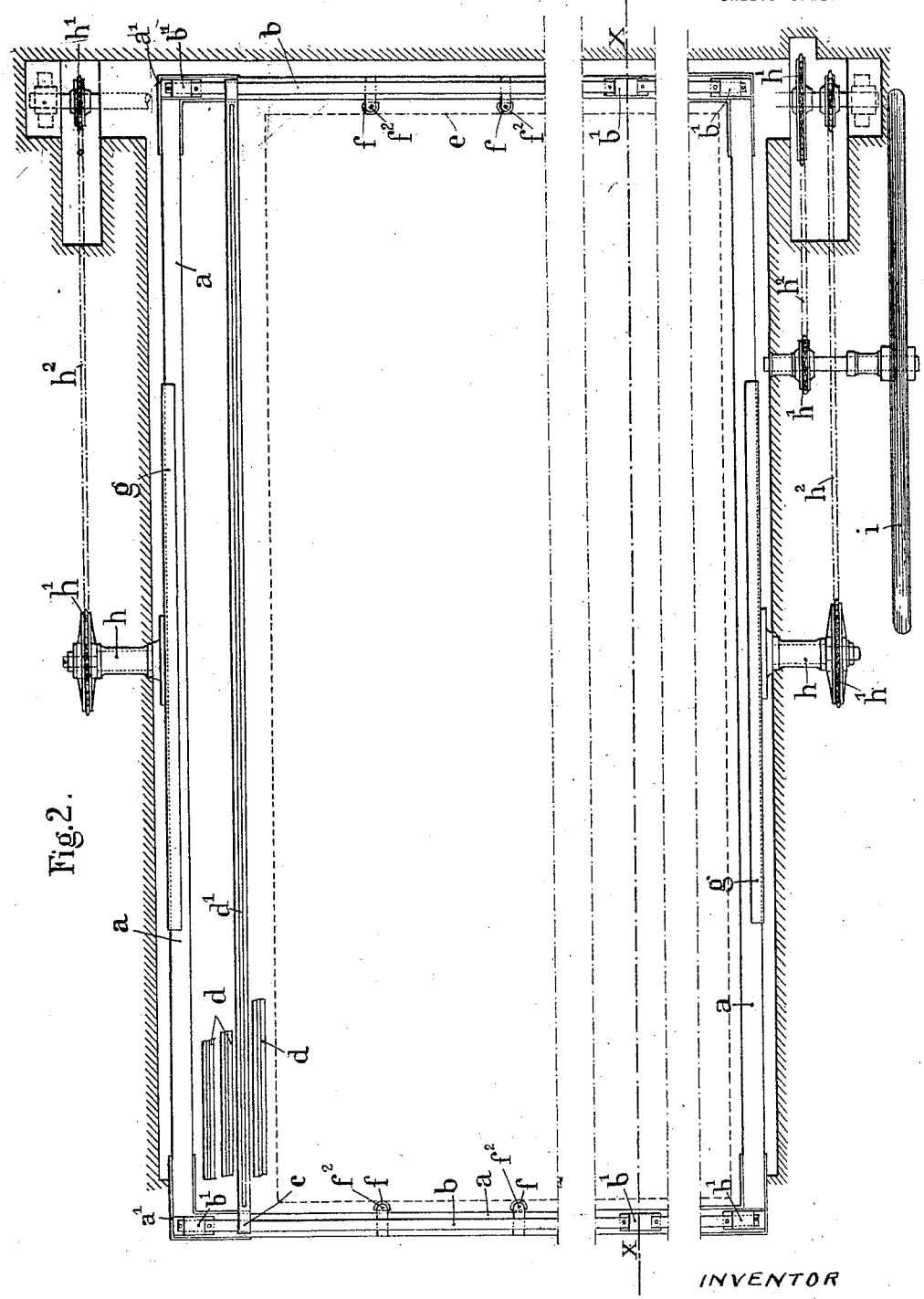

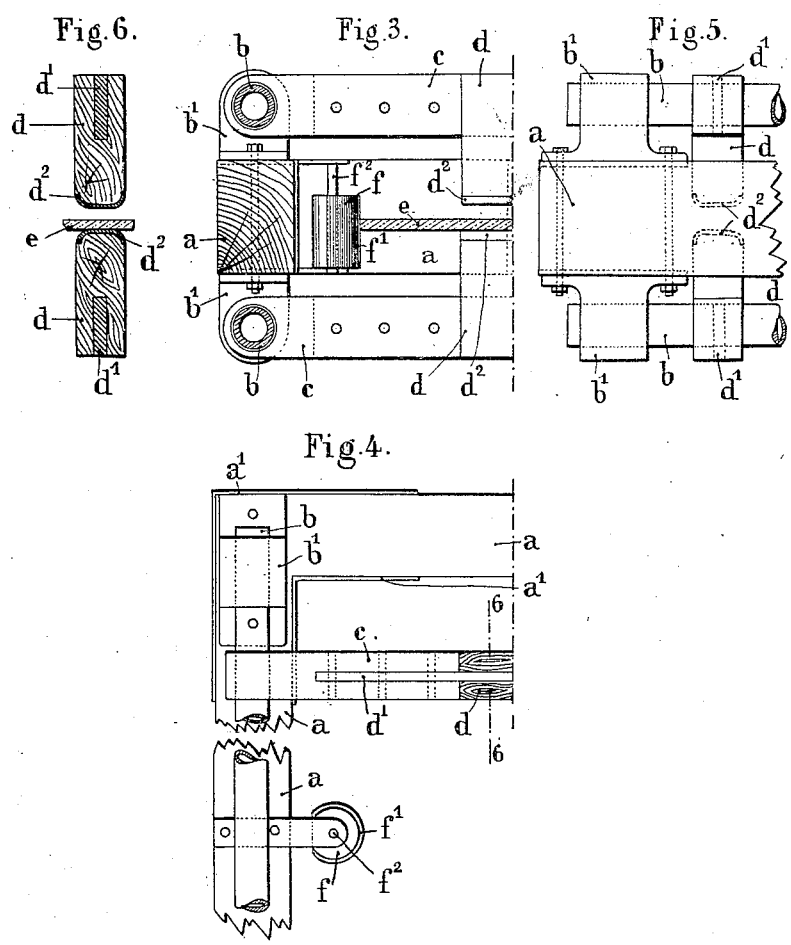

UNITED STATES PATENT OFFICE.

GEORGES HENRI LÉON DEBAECKER, OF SAS-DE-GAND, NETHERLANDS, ASSIGNOR TO SOCIÉTÉ ANONYME DES MANUFACTURES DES GLACES ET PRODUITS CHIMIQUES DE SAINT-GOBAIN CHAUNY & CIREY, OF PARIS, FRANCE, A CORPORATION OF FRANCE.

APPARATUS FOR TURNING OVER SHEETS OF GLASS TO FACILITATE WORKING ON BOTH SIDES OF THE SHEETS.

1,371,868.        Specification of Letters Patent.      Patented Mar. 15, 1921.

Application filed January 30, 1920. Serial No. 355,214.

*To all whom it may concern:*

Be it known that I, GEORGES HENRI LÉON DEBAECKER, a citizen of the Republic of France, and a resident of Sas-de-Gand, Netherlands, have invented new and useful Improvements in Apparatus for Turning Over Sheets of Glass to Facilitate Working on Both Sides of the Sheets, of which the following is a specification.

This invention relates to a rocking or turning table particularly adapted for use in turning over sheets of glass to enable work to be done on both sides of said sheets. It may also be used with sheets other than glass if desired.

According to the invention the table comprises a frame having two superposed gratings slidably mounted thereon and suitably spaced apart. The lower grating serves to support the glass sheet while the upper grating can be moved to one side of the frame so as to leave the upper face of the glass sheet entirely free, or can be pulled out over the upper face of the glass to hold same while the table is turned to support the glass in its turn when said glass has been turned over. The uppermost grating is then pushed out of the way in its turn to expose the surface of the sheet.

These gratings may consist of independent cross pieces with inner facings of felt slidably mounted at each end on tubular rigid bars, secured on the upper and lower sides of the frame at two opposite sides thereof.

Stop pieces in the form of D-shaped rollers covered with felt are mounted on the inside of the frame on the sides parallel to the tubular bars so as to bear against one of the edges of the glass sheet when it is placed on the table and to hold it by this edge during the turning over movement. These stops may also be arranged to slide axially so as to follow the sheet when by the turning of the table the said sheet leaves one grating and rests on the other, the space between the gratings being greater than the maximum thickness of the glass sheets to be worked on.

To enable the invention to be fully understood it will now be described by reference to the accompanying drawings in which—

Figure 1 is a part sectional side elevation of one of the shorter sides of a table constructed according to one form of the invention and Fig. 2 is a plan view thereof;

Fig. 3 is a vertical section drawn to a larger scale and showing the method of mounting the cross pieces on the supporting frame, and Fig. 4 is a plan view, and Fig. 5 is a side view thereof;

Fig. 6 is a cross sectional view on the line 6—6 Fig. 4.

Figure 1:
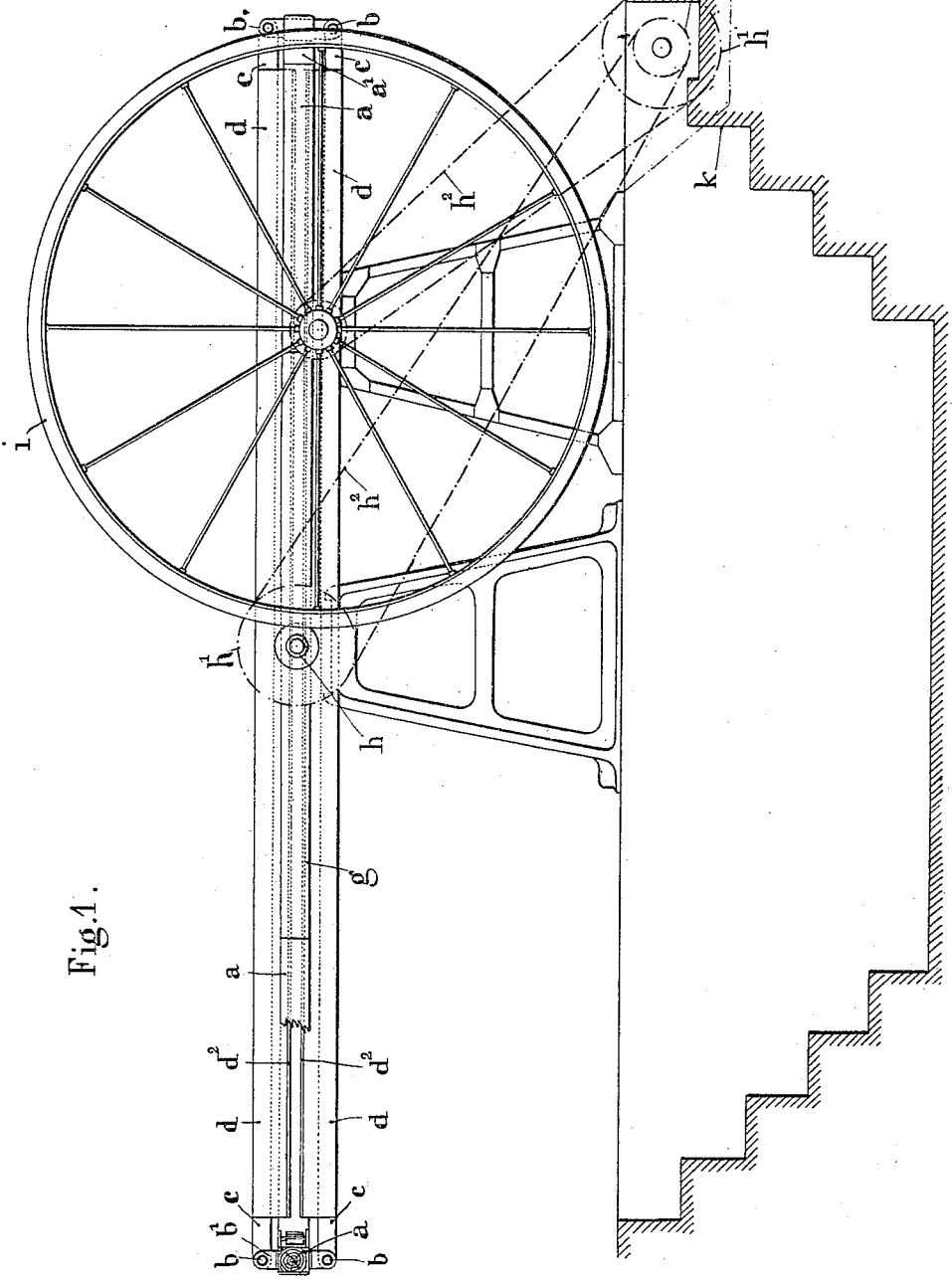

As shown, the table for supporting the sheet consists of a wooden frame $a$ reinforced at its four corners by metal angle pieces $a^1$, the size of the table being sufficient to take the largest sheet of glass likely to be manufactured.

Each long side of the table carries on its upper and lower sides a tubular bar $b$ held in brackets $b^1$ bolted in pairs to the frame as shown. Slidably mounted on the tubular bars $b$ are a series of cross pieces $d$ (four being shown in the drawings by way of example) having end caps $c$ bolted thereto for sliding purposes. These cross pieces are of wood reinforced with a metal strip $d^1$ (Fig. 6) and have a strip of felt $d^2$ on their inner faces and are free to slide parallel with the longer side of the table up to the points where the brackets $b^1$ support the bars $b$. As shown in Fig. 2 these cross pieces on both sides of the frame may all be moved, on either side of the symmetry axis $x$—$x$ of the frame (where the tubular bars $b$ are also held by brackets $b^1$) on the bars $b$ into a space at each side of the table so as to be clear of the space occupied by the glass $e$. The space between the upper and lower cross bars is arranged according to the greatest usual thickness of glass $e$ to be worked (Figs. 1–3 and 6).

On the inside of the frame and on each side parallel to the bars $b$ are secured stop pieces $f$, four for example, each consisting of a D shaped roller covered with felt $f^1$ (Figs. 3 and 4) and slidable upon their axes $f^2$. A D shaped form is given to these bearing rollers to enable the convex portion to be used as a stop for the edge of the glass when desired.

The sides of the frame parallel to the cross pieces are reinforced by U shaped channel irons $g$ on which are mounted the trunnions $h$.

The turning over of the table may be done by hand or motor, the power being applied to the wheel $i$ and being transmitted simultaneously to the two trunnions $h$ by reducing gearing $h^1$, $h^2$.

Movable supports (not shown) are arranged on the ground at the four corners of the table to support it in the working position and other suitable supports are arranged in the pit $k$ for holding the table in a more or less vertical position to allow the glass to be lifted by gripping tools.

The operation of the apparatus is as follows:—The table being in a horizontal position resting on its supports the lower cross pieces $d$ are slid upon the tubes $b$ to form a grating or openwork frame, the spaces between the cross pieces being determined by the size of the glass to be supported, said cross pieces being positioned so as to obtain a suitable distribution of the weight over same. The glass is then placed on this grating and forced against the D shaped stops $f$.

When the work on the upper surface of the glass is finished the upper cross pieces $d$ $d$ which have been gathered toward the sides of the frame out of the way (Fig. 2) are drawn out to form a second grating above the glass. The supports beneath the table are removed and on operating the wheel $i$ the table is turned completely over. After the vertical position has been passed in turning over, the glass falls through a distance of a few millimeters from the first grating to the second, the stops $f$ moving on their axes and following the movement of the glass. When the table is again horizontal the supports are replaced and the uppermost cross pieces are pushed out of the way against the sides of the frame and it now only remains to lift the glass quite flat to work on the exposed face thereof.

The turning table according to this invention does away with the use of gripping tools for turning the glass completely over and the consequent loss of time and great precautions which had formerly to be taken, especially when turning large sheets of glass.

Having now particularly described and ascertained the nature of my said invention and in what manner the same is to be performed, I declare that what I claim is:—

1. A turntable for handling glass sheets and the like, comprising an invertible frame adapted to receive the sheets, and spaced sets of supporting bars associated with the frame and accommodating the sheet between them, the bars of each set being movable to expose the upper face of the sheet for operations thereon while it rests upon the bars of the other set.

2. A turntable for handling glass sheets and the like, comprising an invertible frame adapted to receive the sheet, and spaced sets of supporting bars slidably mounted on the frame and accommodating the sheet between them, the bars of each set being movable to expose the upper face of the sheet for operations thereon while it rests upon the bars of the other set.

3. A turntable for handling glass sheets and the like, comprising an invertible frame adapted to receive the sheets, and spaced sets of supporting bars associated with the frame and accommodating the sheet between them, the bars of each set being movable to expose the upper face of the sheet for operations thereon while it rests upon the bars of the other set, the bars of the respective sets being padded on the faces presented to the interposed sheet.

4. A turntable for handling glass sheets and the like, comprising a frame, spaced sets of cross bars associated with the frame, and between which the sheet is accommodated; in combination with edge supports for the sheet, said edge supports being mounted on the frame and movable in a direction at right angles to the plane of the latter for the purpose set forth.

5. A turntable for handling glass sheets and the like, comprising a frame, spaced sets of cross bars associated with the frame, and between which the sheet is accommodated, in combination with edge supports for the sheet, said edge supports being mounted on the frame and movable in a direction at right angles to the plane of the latter for the purpose set forth, said edge supports comprising D-shaped rollers slidably mounted on their axes.

In testimony whereof I have signed my name to this specification.

GEORGES HENRI LÉON DEBAECKER.

Witnesses:
C. A. WAUBERT,
M. ALVARAD.